(12) United States Patent
Takahagi et al.

(10) Patent No.: US 6,621,944 B1
(45) Date of Patent: Sep. 16, 2003

(54) IMAGE READER

(75) Inventors: Hisahiro Takahagi, Ebina (JP); Kazuman Taniuchi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/450,562

(22) Filed: Nov. 30, 1999

(30) Foreign Application Priority Data

Feb. 9, 1999 (JP) .......................................... 11-031896

(51) Int. Cl.⁷ .................................................. G06K 9/00
(52) U.S. Cl. ........................ 382/319; 382/298; 358/451
(58) Field of Search ................................ 358/518, 540, 358/474–498; 382/162, 167, 312–324

(56) References Cited

U.S. PATENT DOCUMENTS

| | | | | |
|---|---|---|---|---|
| 5,003,627 A | * | 3/1991 | Wataya et al. | 382/312 |
| 5,465,172 A | * | 11/1995 | Fukushima et al. | 358/498 |
| 5,852,501 A | * | 12/1998 | Maehara et al. | 358/505 |
| 5,875,035 A | * | 2/1999 | Motosugi et al. | 358/488 |
| 6,256,112 B1 | * | 7/2001 | Kawano | 358/448 |

FOREIGN PATENT DOCUMENTS

JP          8-191370         7/1996

* cited by examiner

*Primary Examiner*—Jingge Wu
(74) *Attorney, Agent, or Firm*—Morgan, Lewis & Bockius LLP

(57) ABSTRACT

A color copying apparatus is capable of making copies without performing a prescan. Input image data of RGB format read from an image input unit is written in an image memory through the shading/gap correction unit and an input γ correction unit. This input image data is supplied to a detection unit through a first color space conversion unit to distinguish color from monochrome in the input image data, and to detect the base color level and the like. Next, on the basis of these detection results, states of a second color space conversion unit, a selector, a frame-erase/base color removal unit and the like are set. Thus, the input image data is read out again from the image memory, and is supplied to an image output unit through the first color space conversion unit to an output γ correction unit.

14 Claims, 12 Drawing Sheets

FIG.11B
PRESCANLESS MODE

FIG.12

IMAGE READER

BACKGROUND OF THE INVENTION

1. Technical Field of the Invention

The present invention relates to an image reader suitable for a color copying apparatus.

2. Description of the Prior Art

As originals for a color copying apparatus, there may be mixed color originals and monochrome originals. With respect to monochrome originals, higher-quality output results can be obtained by performing image processing specific to the monochrome originals rather than that for the color originals. Also, in a popular type color copying apparatus, the output time can be shortened when it is set to a monochrome mode in advance because a common printer engine is sequentially used for each of YMCK colors.

Since it is troublesome for the user to set a mode of operation for each original, the color copying apparatus side generally distinguishes color from monochrome of the original to set the mode of operation in accordance with the distinction result. Also, in the color copying apparatus, in a case where the entire original is lightly discolored yellow, a so-called base color removal process for converting the information into "white" is preferably performed. In the case of performing this process, the base color level must also be detected in advance.

In order to perform such color/monochrome distinction and base color level detection as described above, prescan (before the original image reading, rough scan to be performed in advance at a speed several times faster than it) has been generally performed in the conventional color copying apparatus. Since the color/monochrome distinction of the original and the detection of the base color level can be performed by performing the prescan once, the image output can be started substantially the moment reading of the original image is finished on scanning (hereinafter, referred to as image scan) for the originally-designed image reading.

In this respect, as a monochrome-only copying apparatus, there has been known a copying apparatus capable of starting the image output at a point of time whereat the original image has been read to some degree without performing the prescan (for example, Japanese Published Unexamined Patent Application No. 8-191370). In the color copying apparatus, however, it is difficult to distinguish color from monochrome of the original and to determine the base color level when the original image has been read up to a certain part. This is because there may be cases where even if portions which have already been read are all monochrome, a color pattern exists in the remaining portion, and where the base color level must be changed when the yellow-discolored state of the original differs depending upon the place, among the others.

SUMMARY OF THE INVENTION

As described above, there is the problem that when the prescan is performed in the color copying apparatus, the productivity is deteriorated by time corresponding to the prescan. The present invention has been achieved in the light of the above-described state of affairs, and provides an image reader capable of performing image output at high speed.

The image reader has an image reading unit that reads an image of an original as image data to be expressed in a first color space, an image accumulation unit that accumulates the image data read by the image reading unit, an attribute distinction unit that distinguishes an attribute of the image data read by the image reading unit, a setting unit that sets a conversion characteristic of the image data in response to the attribute distinguished by the attribute distinction unit, and a conversion unit that converts the image data accumulated in the image accumulation unit into image data to be expressed in a second color space in accordance with the conversion characteristic set by the setting unit.

In the image reader, the attribute of the input image data may contain at least one of a size of the original, a base color level of the input image data, and whether the input image data is monochromatic or colored. The image reader may further include a path bypassing the image accumulation unit to supply the input image data to the attribute distinction unit.

In the image reader, the image reading unit may sequentially read images of multiple originals to output them as the input image data, and the image accumulation unit may have multiple memory banks, each having a capacity for storing input image data of one original. The image accumulation unit may write new input image data in one of the memory banks and at the same time, the unit may output input image data already written from another memory bank.

In the image reader, the image reading unit may sequentially read contents of multiple originals to output them as the input image data, and the image accumulation unit may write new input image data and at the same time, the unit may output the input image data already written.

In the image reader, the attribute may be distinguished in the attribute distinction unit in parallel with accumulation of the input image data in the image accumulation unit.

The present invention also provides an image reader for reading an original set on an automatic document feeder or a platen glass, having a determination unit that determines whether the original has been set on the automatic document feeder or the platen glass, and an image input unit that performs, if the determination unit determines that the original has been set on the platen glass, an image scan after an attribute of image data of the original is distinguished using a prescan, and that performs, if the determination unit determines that the original has been set on the automatic document feeder, the image scan without performing the prescan.

The present invention also provides an image reader for reading an original set on an automatic document feeder or a platen glass, having a determination unit that determines whether the original has been set on the automatic document feeder, and whether a number of copies is not more than a predetermined number, and an image input unit that performs an image scan after an attribute of image data of the original is distinguished using a prescan if a result of the determination by the determination unit is negative, and performs the image scan without performing the prescan if the result of determination is affirmative.

The present invention also provides an image reader for reading an original, having an operating unit that sets a magnification ratio for reproducing the original, and an image input unit that performs an image scan without performing a prescan if the magnification ratio of 100% or its integral multiple has been set in the operating unit, and that performs the image scan after an attribute of image data of the original is distinguished using the prescan if the magnification ratio other than 100% or its integral multiple has been set.

BRIEF DESCRIPTION OF THE DRAWINGS

Preferred embodiments of an image reader according to the present invention will be described in detail based on the drawings.

DETAILED DESCRIPTION OF PREFERRED EMBODIMENTS

1. First Embodiment 1.1 Structure of the Embodiment

Next, with reference to FIG. 1, the description will be made of the structure of a printer 1 according to the first embodiment of the present invention.

Figure 1:
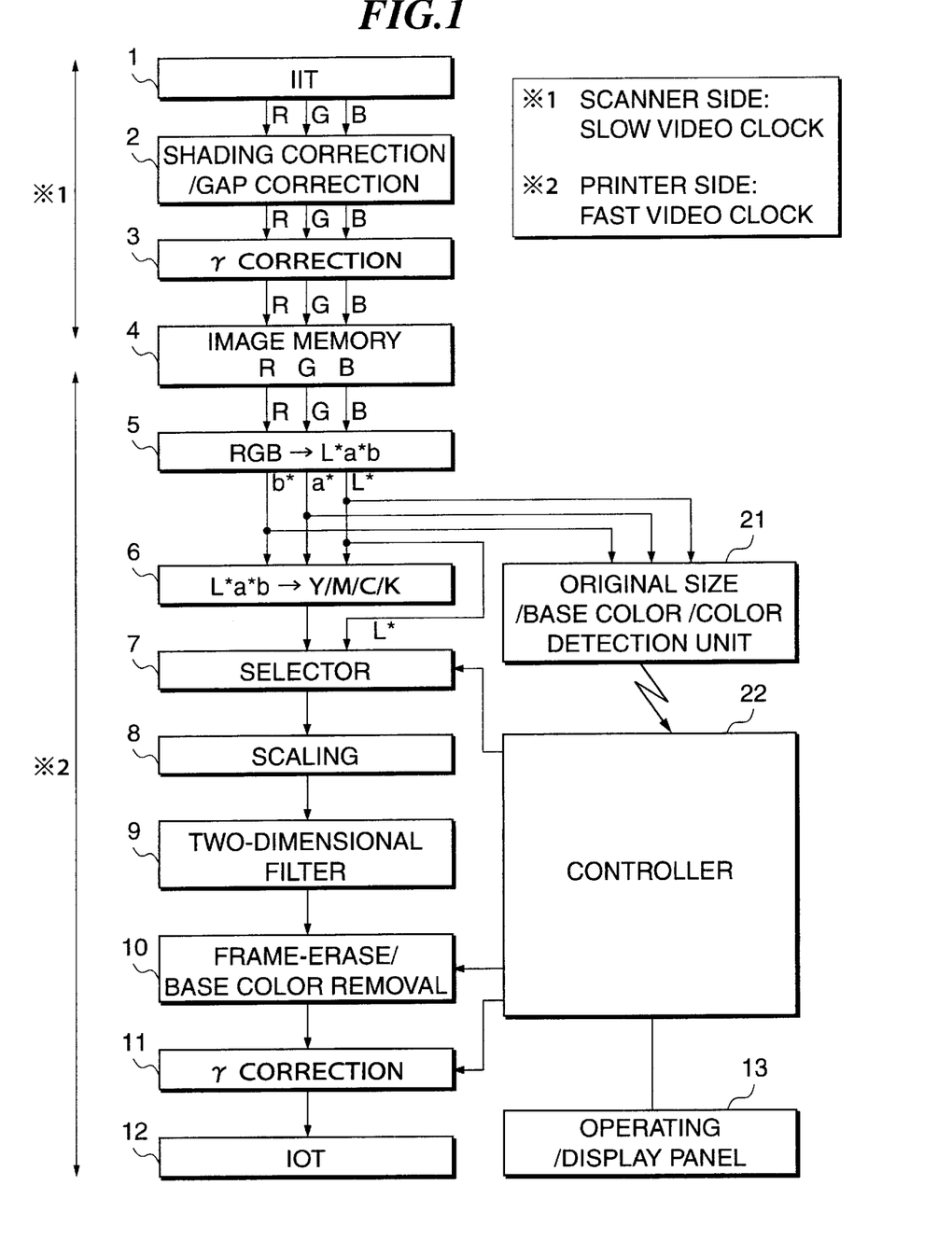
FIG. 1 is a block diagram showing the structure of a first embodiment according to the present invention.

In FIG. 1, the reference numeral 1 designates an image input unit, which has a 3-line CCD; a carriage for moving this in a sub-scanning direction; a platen glass for the user to place an original thereon; an automatic document feeder and the like. In this respect, the 3-line CCD is obtained by linearly arranging CCD of R, G and B colors for each color and arranging them at predetermined intervals (generally an integral multiple of the pixel interval) in parallel along the sub-scanning direction. In the case of performing reduction/enlargement in the present embodiment, the conveying speed of the carriage is set in accordance with the magnification ratio.

The reference numeral 2 designates a shading/gap correction unit, and input image data of a RGB format outputted from the image input unit 1 is subjected to shading correction and gap correction. The shading correction is to correct so as to make white levels, which fluctuate in the input image data along the sub-scanning direction, constant. Also, in the above-described 3-line CCD, timing at which the same point on the original is read differs for each color. The gap correction is to correct such that these timing coincides with one another.

In the case of making copies at the same size, the gap correction is only to simply delay the timing of each color of the input image data in accordance with physical intervals of the 3-line CCD. This delay time is an integral multiple of a 1-line reading period in the sub-scanning direction. In the case of performing the reduction/enlargement, however, the delay time between each color generally does not become an integral multiple of the 1-line reading period. In such a case, therefore, it is necessary to subject the upper and lower lines in the input image data to interpolation, and to determine appropriate pixel values for each color.

The reference numeral 3 designates an input γ correction unit, which subjects image data outputted from the shading/gap correction unit 2 to the γ correction. The reference numeral 4 designates an image memory, which stores the image data of RGB format subjected to the γ correction. Therefore, in the case of performing the reduction/enlargement, the image data subjected to the reduction/enlargement only in the sub-scanning direction is to be stored in the image memory 4.

Figure 9:
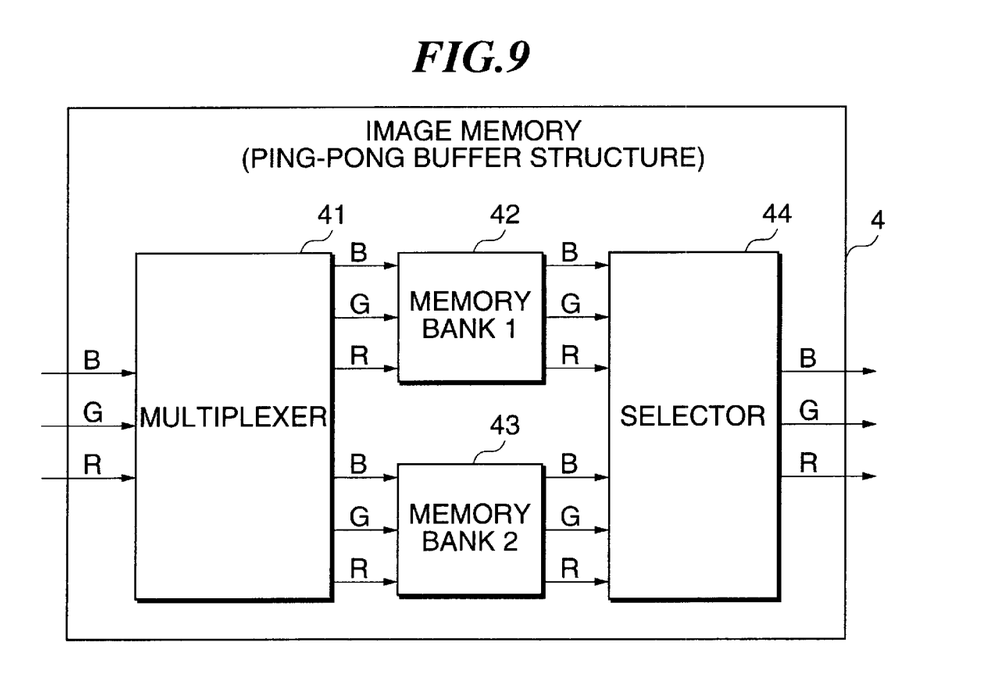
FIG. 9 is a detailed block diagram showing an image memory 4.

With reference to FIG. 9, the description will be made of the detailed structure of the image memory 4. In FIG. 9, the reference numerals 42 and 43 designate memory banks, each of which has a capacity capable of storing the input image data for one page. The reference numeral 41 designates a multiplexer, which supplies the input image data of RGB format to the memory banks 42 and 43; and 44, a selector, which selects either memory bank 42 or 43 for outputting.

Since a ping-pong buffer structure has been adopted for the image memory 4 as described above, it is possible to read out, while writing in either of the memory banks, from the other one. Therefore, it is possible to perform output processing based on input image data read previously while new input image data is being read.

Reverting to FIG. 1, the reference numeral 5 designates a first color space conversion unit, which converts the image data of RGB format stored in the image memory 4 into an L*a*b* format; 6, a second color space conversion unit, which converts the image data of the L*a*b* format into image data of YMCK format for output; 7, a selector, which selects either the image data of YMCK format outputted from the second color space conversion unit 6 or L* data outputted from the first color space conversion unit 5 for outputting. In other words, the former is selected on performing color output, while the latter is selected on performing monochrome output.

The reference numeral 8 designates a scaling unit, which performs a scaling process in the main scanning direction on performing the reduction/enlargement; 9, a two-dimensional filter unit, which performs a filtering process such as edge emphasizing; 10, a frame-erase/base color removal unit, which removes a black frame portion in the peripheral edge area of the image data, and removes the base color in the color image data; 11, an output γ correction unit, which subjects the image data outputted from the frame-erase/base color removal unit 10 to the γ correction; and 12, an image output unit, which outputs the image data subjected to the γ correction onto a sheet.

The reference numeral 21 designates an original size/base color/color detection unit, which detects the original size and the base color, and distinguishes color from monochrome on the basis of the image data of L*a*b* format outputted from the first color space conversion unit 5; 22, a controller, which controls each portion described above on the basis of the detection result and the like of the detection unit 21; 13, an operating/display panel, which is provided with a display displaying various information for the user and an operating panel for which the user performs various setting.

1.2 Operation of the Embodiment

A description will be made of the operation of the present embodiment. When the user sets an original onto the platen glass or the automatic document feeder to depress a start-button provided on the operating/display panel 13, the contents of this original are read in the image input unit 1. The contents thus read are stored in the image memory 4 through the shading/gap correction unit 2 and the input γ correction unit 3 as the input image data of RGB format sequentially.

Next, under the control of the controller 22, the image data stored in the image memory 4 is converted into image data of L*a*b* format through the first color space conversion unit 5 to be supplied to the original size/base color/color detection unit 21. In this respect, since the components between the second color space conversion unit 6 and the image output unit 11 are set to an OFF state at the time, no image output is performed.

In the detection unit 21, the original size and the base color level are determined, and color is distinguished from monochrome on the basis of the image data of L*a*b* format, and the results are supplied to the controller 22. The controller 22 sets a selection state of the selector 7 on the basis of the color/monochrome distinction result in such a manner that image data of YMCK format is selected for the color original and L* data is selected for the monochrome original.

Also, the controller 22 sets the conversion characteristic in the second color space conversion unit 6, the base color level in the frame-erase/base color removal unit 10, the characteristic in the output γ correction unit 11 and the like on the basis of the above-described detection results. Next, under the control of the controller 22, the contents of the image memory 4 are read out again.

At this time, the operation of the original size/base color/color detection unit 21 is set to an OFF state, and the components between the second color space conversion unit 6 and the image output unit 12 are driven. Thus, a monochrome image based on the L* data or a color image based on the image data of YMCK format is to be outputted through the image output unit 12.

Figure 2:
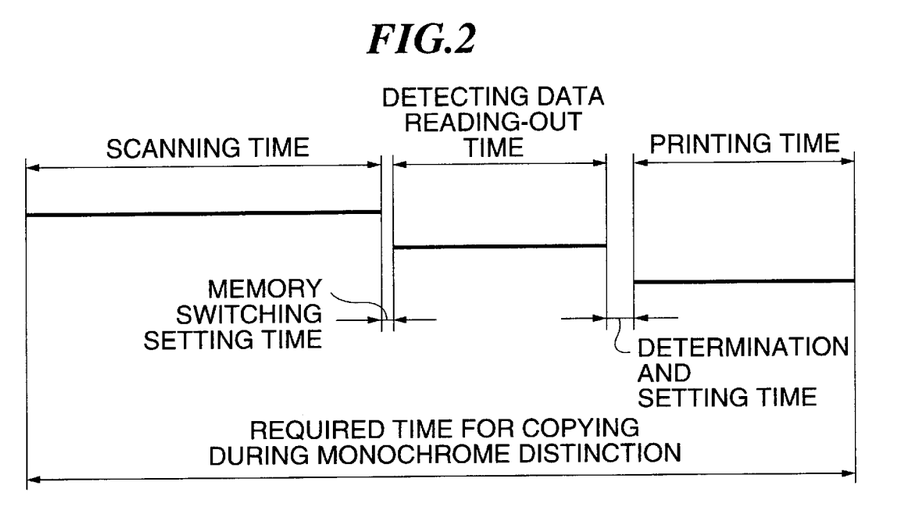
FIG. 2 is a timing chart for the first embodiment.

FIG. 2 shows a simple timing chart according to the present embodiment. In the beginning, the original image is read to be stored in the image memory 4 in "scanning time" in FIG. 2. Thereafter, in a "detecting data reading-out period", the input image data is supplied to the original size/base color/color detection unit 21 in order to detect the original size and the like. On the basis of the detection results, the image data is outputted onto a sheet or the like in "printing time". In this case, any image cannot be outputted during the "detecting data reading-out period". Hereinafter, a description will be made of another embodiment in which this period is shortened or removed.

2. Second Embodiment
2.1 Structure of the Embodiment

Figure 3:
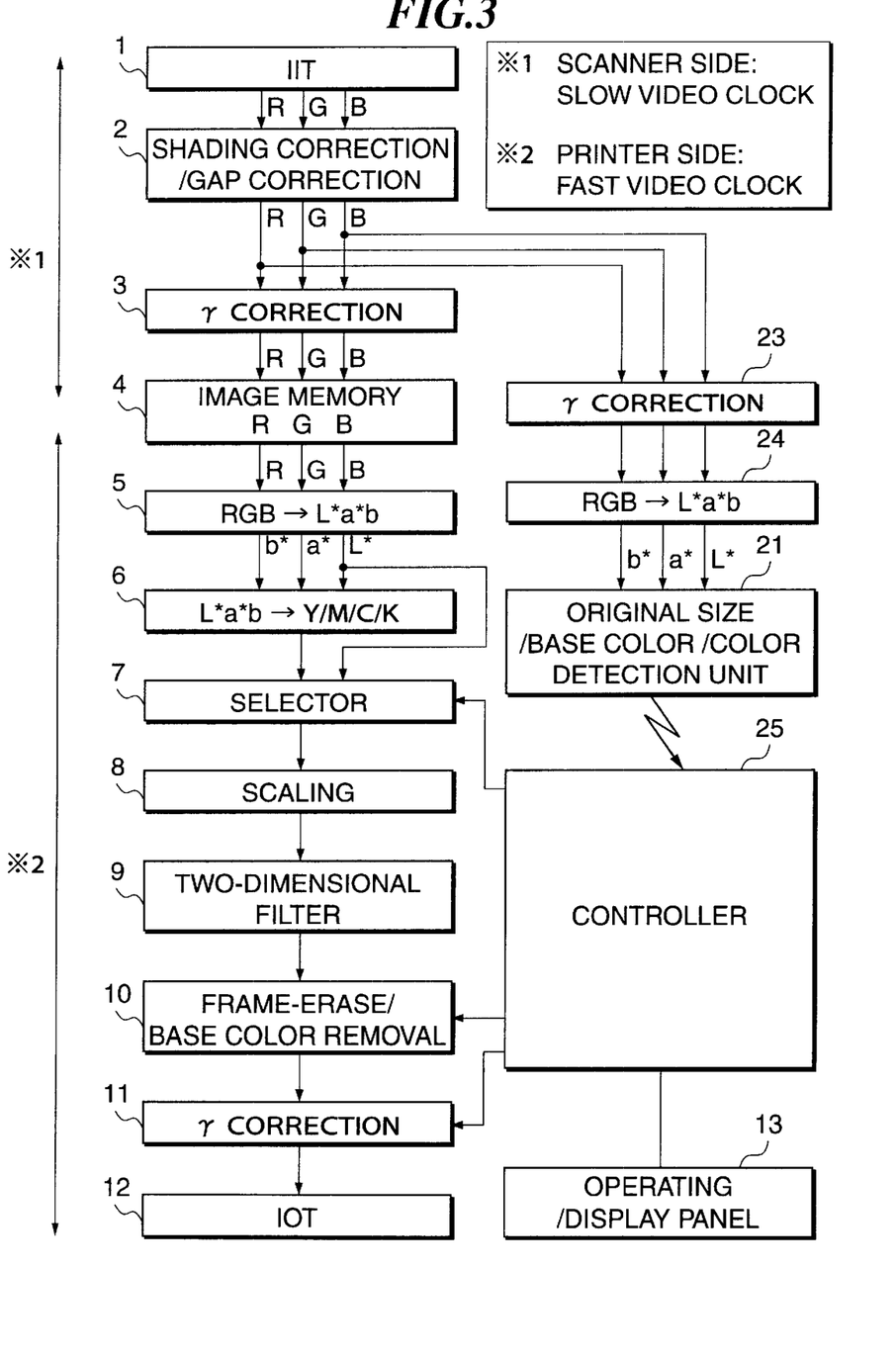
FIG. 3 is a block diagram showing the structure of a second embodiment according to the present invention.

FIG. 3 shows the structure of the second embodiment according to the present invention. In this respect, in FIG. 3, components equivalent to those in FIG. 1 are represented by the same reference numerals. In FIG. 3, the reference numeral 23 designates a γ correction unit for detection, which is constructed in the same manner as the input γ correction unit 3. However, the γ correction unit for detection 23 is adjusted so as to be suitable for detection such as the base color level detection, and therefore, it is provided independently of the input γ correction unit 3.

The reference numeral 24 designates a color space conversion unit for adjustment, which is constructed in the same manner as the first color space conversion unit 5. In the present embodiment, the original size/base color/color detection unit 21 detects the original size and the base color level, and distinguishes color from monochrome of the input image data on the basis of the image data outputted by this color space conversion unit for adjustment 24. The reference numeral 25 designates a controller, which controls each component described above.

2.2. Operation of the Embodiment

Next, a description will be made of the operation of the present embodiment. When the user sets an original onto the platen glass or the automatic document feeder to depress the start-button provided on an operating/display panel 13, the contents of this original are read in the image input unit 1 as in the case of the first embodiment. The contents thus read are stored in the image memory 4 through the shading/gap correction unit 2 and the input γ correction unit 3 as input image data of RGB format sequentially.

Also, in parallel with this, the input image data outputted from the shading/gap correction unit 2 is supplied to the original size/base color/color detection unit 21 through the γ correction unit for detection 23 and the color space conversion unit for adjustment 24. Thus, in the detection unit 21, the original size and the base color level are detected, and color is distinguished from monochrome of the input image data in parallel with the storage of the image data in the image memory 4.

When all the input image data is stored in the image memory 4, the detection results are supplied to the controller 25 from the detection unit 21 after a slight time delay. Next, in the controller 25, the selection state of the selector 7, the conversion characteristic in the second color space conversion unit 6, the base color level in the frame-erase/base color removal unit 10, the characteristic in the output γ correction unit 11 and the like are set on the basis of the detection results.

After the completion of the above-described setting, the contents of the image memory 4 are read out under the control of the controller 25. This image data of the RGB format is converted into the L*a*b* format through the first color space conversion unit 5, and thereafter, as in the case of the first embodiment, is outputted from the image output unit 12 through the second color space conversion unit 6 to the output γ correction unit 11 sequentially.

Figure 4:
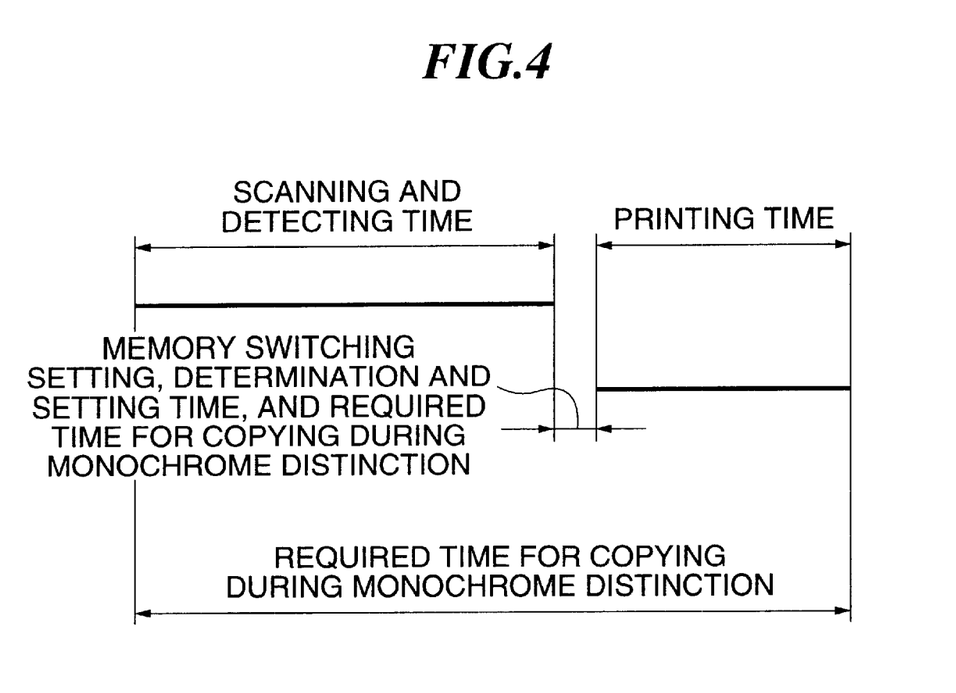
FIG. 4 is a timing chart for the second embodiment.

FIG. 4 shows a simple timing chart according to the present embodiment. In the beginning, the original image is read to be stored in the image memory 4 in "scanning and detecting time" in FIG. 4. Also, in parallel with this, the input image data is supplied to the original size/base color/ color detection unit 21 in order to detect the original size and the like.

Thereafter, the image data is outputted onto a sheet or the like in "printing time" after somewhat setting time and the like. As will be apparent from the figure, in the present embodiment, since the image can be outputted immediately after the completion of the "scanning and detecting time", it is possible to output the image at a still higher speed.

Figure 10:
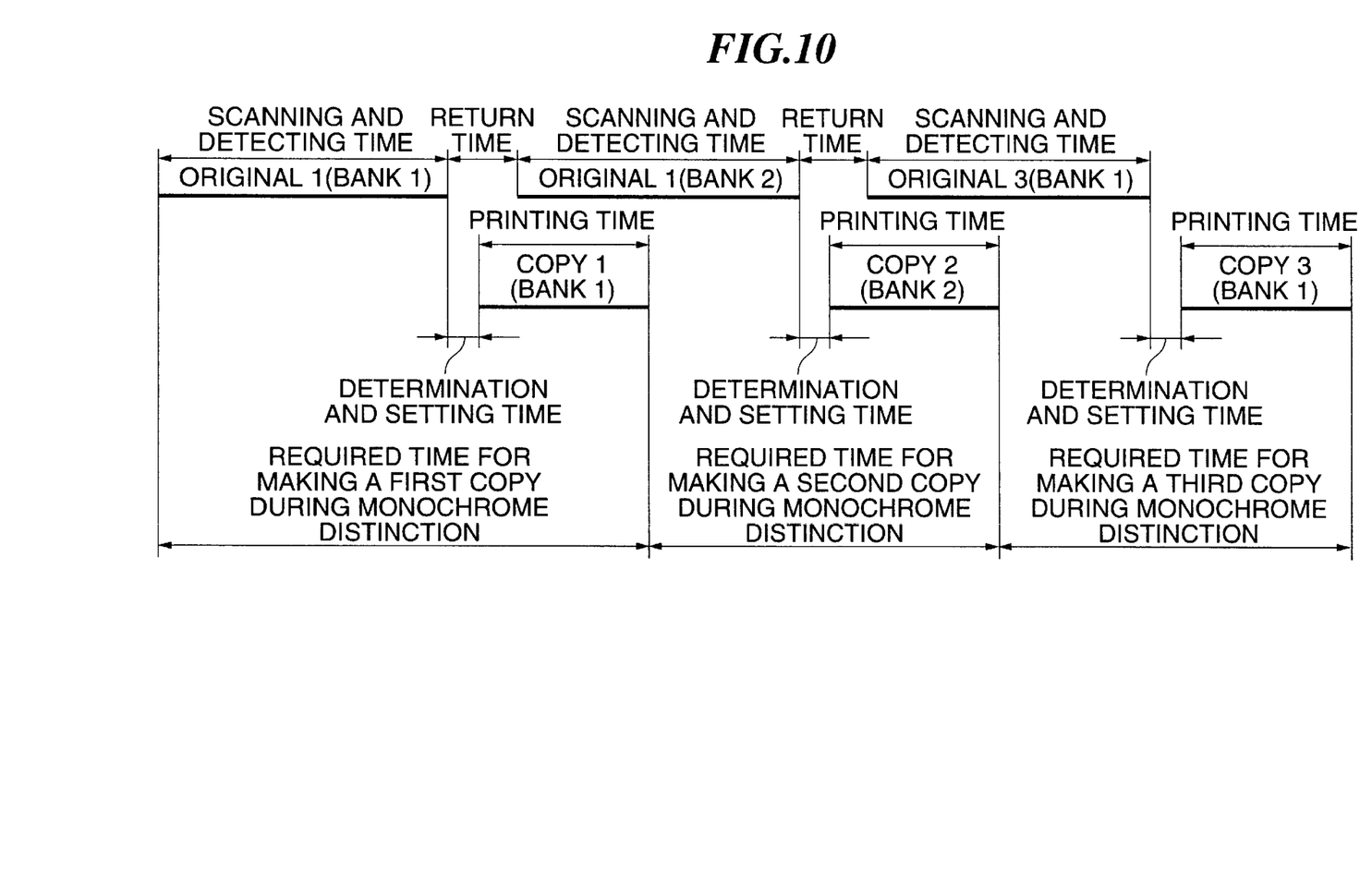
FIG. 10 is a timing chart when a continuous original is copied in the second embodiment.

FIG. 10 shows a timing chart for a plurality of originals. FIG. 10 is equal to a plurality of timing charts of FIG. 4 superimposed. By the adoption of the ping-pong buffer structure for the image memory 4, it is possible to output an original image through one memory bank and to, at the same time, input another original image through another memory bank. Generally, time for outputting a monochrome image can be made shorter than a reading cycle for the original image in consideration of return time. Therefore, a cycle for outputting an image can be restrained to the sum of the "scanning and detecting time" and "return time" of the carriage in the image input unit 1.

3. Third Embodiment
3.1. Structure of the Embodiment

Figure 5:
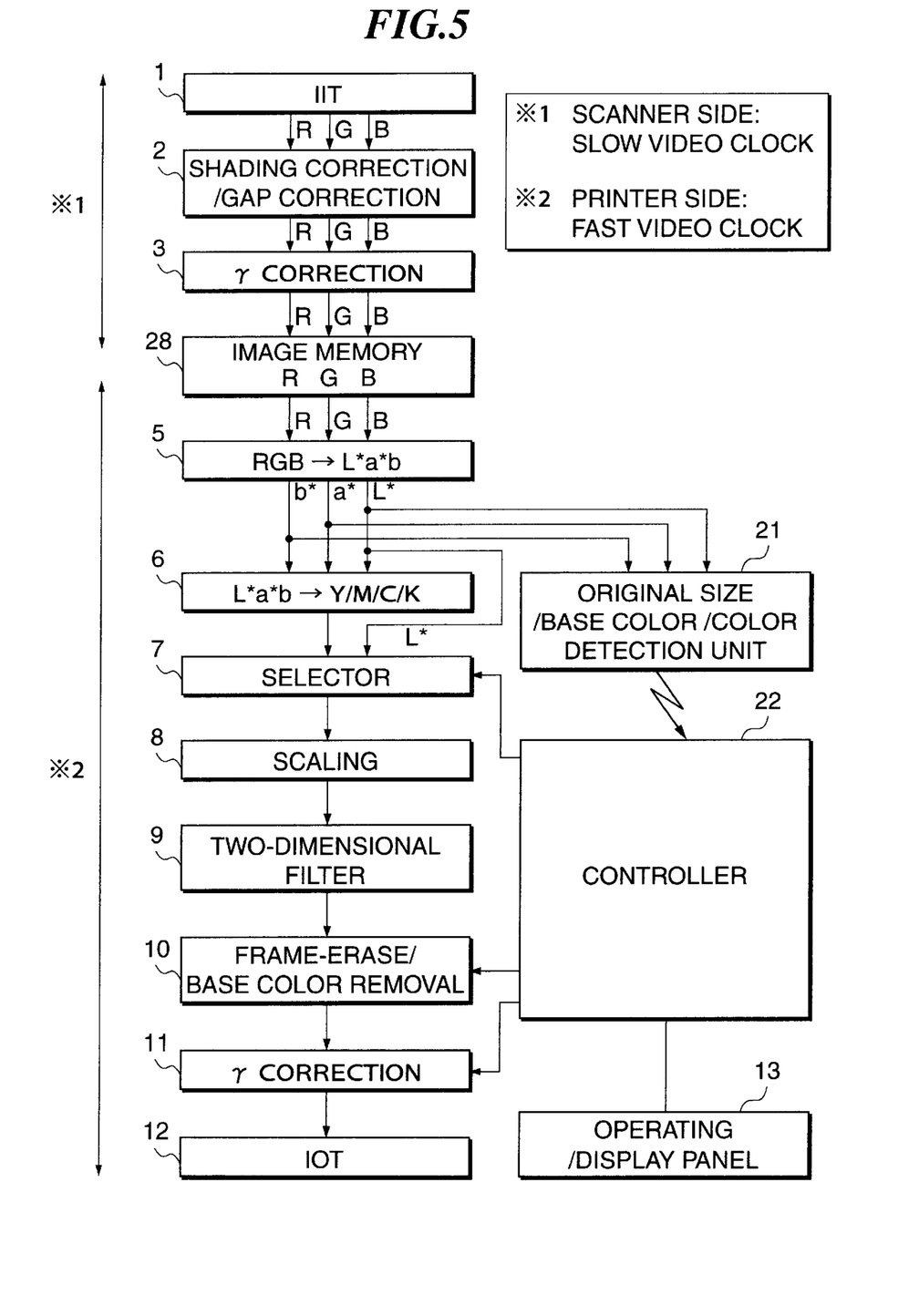
FIG. 5 is a block diagram showing the structure of a third embodiment according to the present invention.

FIG. 5 shows the structure of the third embodiment according to the present invention. In this respect, in FIG. 5, components equivalent to those in FIGS. 1 and 3 are represented by the same reference numerals. In FIG. 5, the reference numeral 28 designates an image memory, which is provided in place of the image memory 4 in the first and second embodiments. The image memory 28 has two memory banks as in the case of the image memory 4, and each memory bank is constructed so as to be able to read and write image data respectively at the same time. In this respect, the structure of such a memory is disclosed in, for example, Patent Gazette 2501195 and the like. The reference numeral 27 designates a controller, which controls each component described above.

3.2. Operation of the Embodiment 3.2.1. Operation in Prescanless Mode

In the present embodiment, on making copies, either a mode of operation (prescan mode) for performing prescan or a mode of operation (prescanless mode) for performing no prescan is selected as in the case of the prior art. More specifically, when the start-button on an operating/display panel 13 is depressed, it is detected by the controller 27 whether or not an original has been set on the automatic document feeder.

If an original on the automatic document feeder has been detected, the prescanless mode is selected, and if not detected, that is, if the original has been set on the platen glass, the prescan mode is selected. In this respect, the reason will be described later.

First, the operation in the prescanless mode will be described. When the user sets an original onto the automatic document feeder to depress the start-button provided on the operating/display panel 13, the contents of this original are read in the image input unit 1 as in the case of the first and second embodiments. The contents thus read are sequentially stored in the image memory 28 through the shading/gap correction unit 2 and the input γ correction unit 3 sequentially as input image data of RGB format.

At a point of time when a predetermined amount of input image data has been stored in the image memory 28, reading-out of the image memory 28 is started under the control of the controller 27, the input image data is converted into the L*a*b* format through the first color space conversion unit 5, and thereafter, is supplied to the original size/base color/color detection unit 21. In this respect, at this time, the components between the second color space conversion unit 6 and the image output unit 12 are set to an OFF state, and therefore, no image is outputted.

Thus, in the original size/base color/color detection unit 21, the original size and the base color level are detected, and color is distinguished from monochrome of the input image data. When all the input image data is stored in the image memory 28, reading-out of the image data by the original size/base color/color detection unit 21 is also completed immediately. In other words, the reading-out start timing by the detection unit 21 has been set in such a manner that end timing for writing the input image data in the image memory 28 substantially coincides with end timing for reading out the image data by the original size/base color/color detection unit 21.

Next, in the detection unit 21, the original size and the base color level are detected, and color is distinguished from monochrome in the input image data, and the controller 27 is notified of the results. Next, in the controller 27, the selection state of the selector 7, the conversion characteristic in the second color space conversion unit 6, the base color level in the frame-erase/base color removal unit 10, the characteristic in the output γ correction unit 11 and the like are set on the basis of the detection results.

After the completion of the above-described setting, the contents of the image memory 28 are read out under the control of the controller 27. This image data of the RGB format is converted into the L*a*b* format through the first color space conversion unit 5, and thereafter, as in the case of the first embodiment, is outputted from the image output unit 12 through the second color space conversion unit 6 to the output γ correction unit 11 sequentially.

Figure 6:
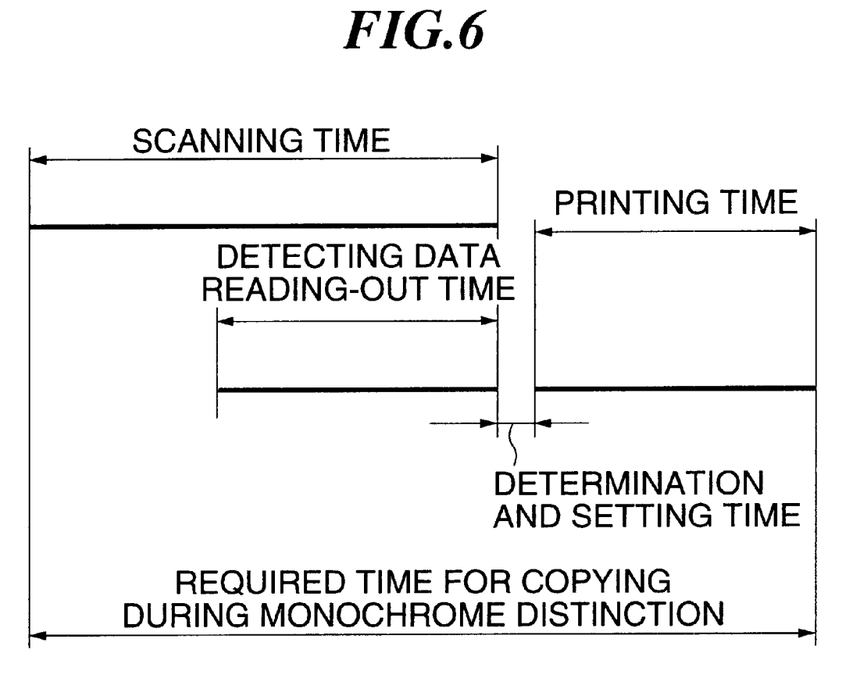
FIG. 6 is a timing chart for the third embodiment.

FIG. 6 shows a simple timing chart according to the present embodiment. In the beginning, when the "scanning time" in FIG. 6 is started, the original image is read to be stored in the image memory 28. At a point of time whereat a predetermined amount of input image data has been stored in the image memory 28, reading-out of the image data by the detection unit 21 is started. More specifically, the "reading-out time for detecting data" is started. Thus, at the completion of the "scanning time", the "reading-out time for detecting data" is also completed immediately.

Thereafter, the image data is outputted onto a sheet or the like in "printing time" after a certain period of setting time and the like. As will be apparent from the figure, in the prescanless mode of the present embodiment, since the image can be outputted immediately after the completion of the "scanning time", it is possible to output the image at a further higher speed than in the first embodiment.

3.2.2. Operation in Prescan Mode

Next, the description will be made of the operation in the prescan mode. When the user sets an original onto the platen glass to depress the start-button provided on the operating/display panel 13, prescan is performed at a speed several times faster than the image scan. The input image data of the RGB format read is stored in the image memory 28.

After the completion of the prescan, the carriage of the image input unit 1 is returned to the initial position. In parallel with the return of this carriage, the input image data thus prescanned is read out from the image memory 28, is converted into the L*a*b* format through the first color space conversion unit 5, and thereafter, is supplied to the original size/base color/color detection unit 21. Thus, in the original size/base color/color detection unit 21, the original size and the base color level are detected, and color is distinguished from monochrome in the input image data, and the controller 27 is notified of the results.

Next, in the controller 27, the selection state of the selector 7, the conversion characteristic in the second color space conversion unit 6, the base color level in the frame-erase/base color removal unit 10, the characteristic in the output γ correction unit 11 and the like are set on the basis of the detection results. Thereafter, the return of the carriage is completed, and when the effect is detected by the controller 27, the image scan is next performed.

While the image scan is being executed, the input image data is successively stored in the image memory 28. In this case, at a point of time whereat a predetermined amount of input image data has been stored in the image memory 28, reading-out of the image memory 28 is executed in parallel. The image data of the RGB format thus read out is converted into the L*a*b* format through the first color space conversion unit 5, and thereafter, as in the case of the prescanless mode, is outputted from the image output unit 12 through the second color space conversion unit 6 to the output γ correction unit 11 sequentially.

3.2.3 Reason for Selecting the Mode of Operation

Figures 11, 11A, 11B:
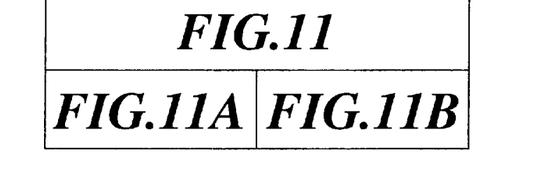
FIGS. 11A and 11B are timing charts when continuous originals are copied in the third embodiment.
Figure 11A:
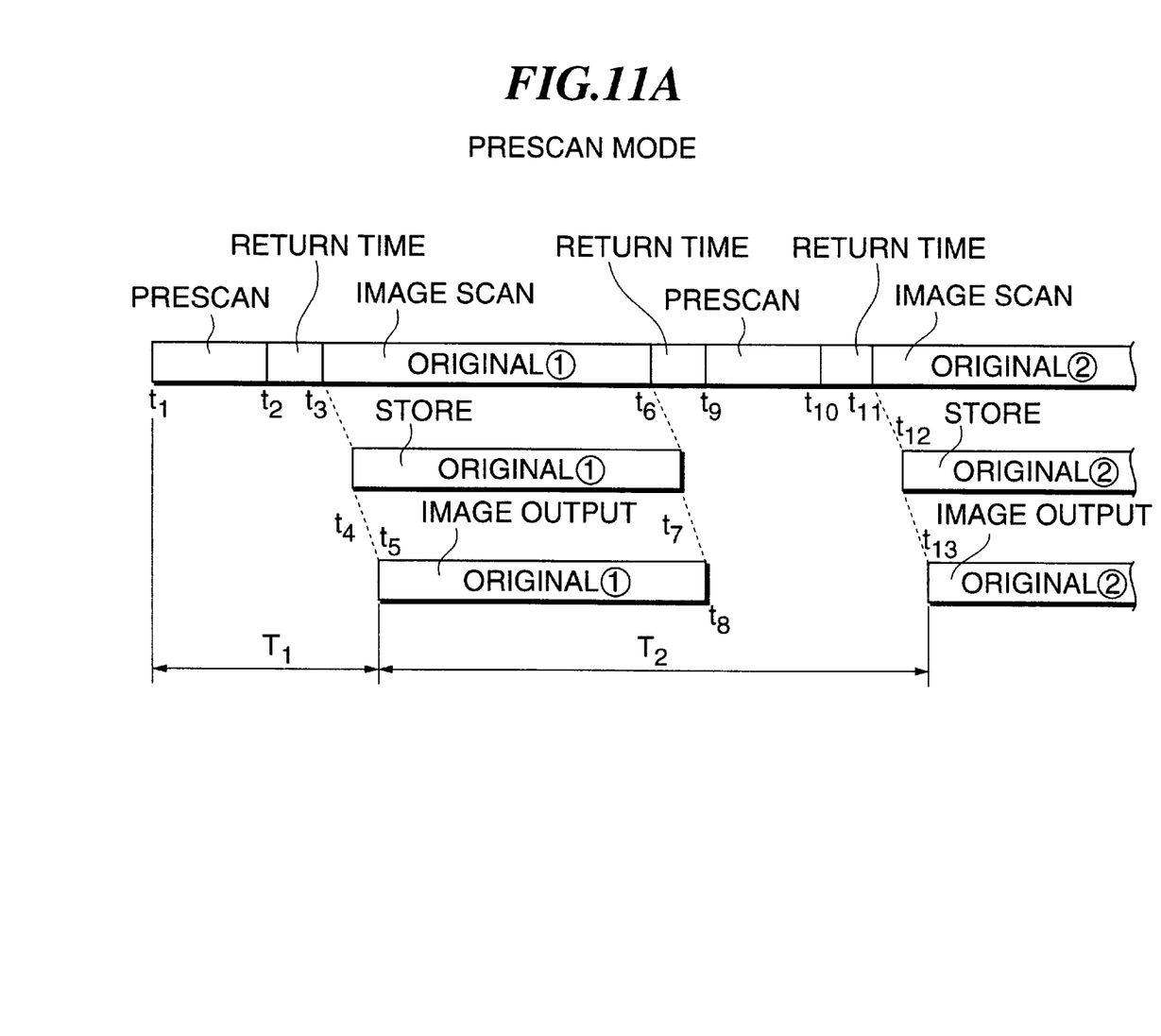
Figure 11B:
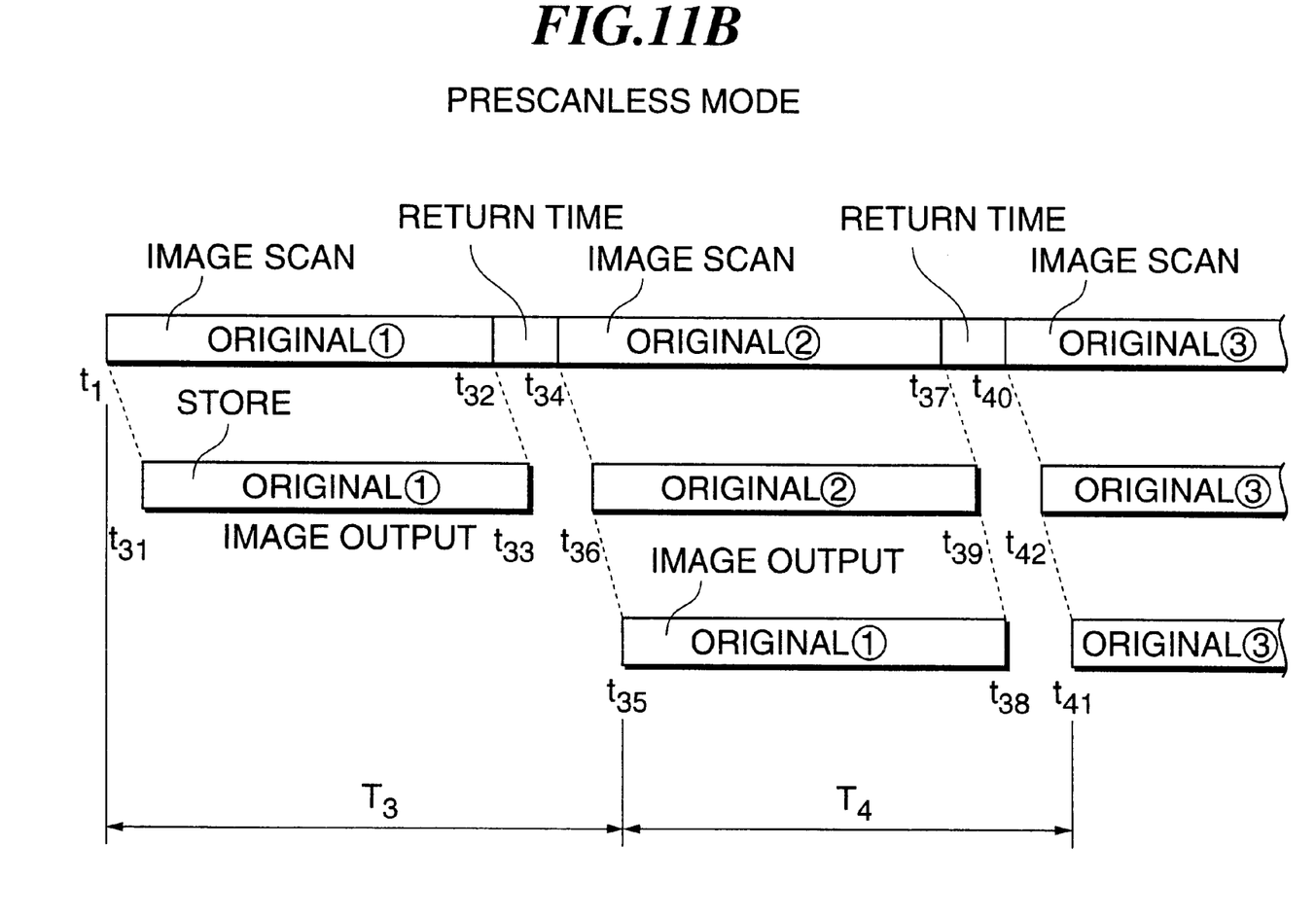

FIGS. 11A and 11B are timing charts in the prescan mode and the prescanless mode. These timing charts show a case where an automatic document feeder is used, a single engine is used as the image output unit 12, a plurality of originals are copied one sheet at a time while color is automatically being distinguished from monochrome, and all the originals have turned to be monochromatic as a result.

In this respect, if a four-throw tandem engine is used for the image output unit 12, the similar results can be obtained even when the originals are colored. Also, when the automatic document feeder is used in the present embodiment as described above, the prescanless mode is certainly selected, and in FIG. 11A, there is assumed, for comparison, a case where the prescan mode has been selected using the automatic document feeder as in the case of the prior art.

In the case of making a copy of monochrome originals, an image reading cycle becomes longer than time required for image output in consideration of return time in the image input unit 1, and therefore, time required for making a copy of each original is controlled by the image reading cycle. In the prescan mode, time T2 (prescan time+image scan time+2×return time) indicated in FIG. 11A is required to read one original. In contrast, in the prescanless mode, since one original can be read within time T4 (image scan time+return time) indicated in FIG. 11B, it can be seen that it is advantageous in respect of required time per original when a plurality of originals are copied one sheet at a time.

The time when output of a first copy of the originals is completed is, however, time t8 in the prescan mode, whereas it is time t38, later than the time t8 in the prescanless mode. This is because in the prescanless mode, color/monochrome distinction and the like of the originals cannot be performed before the image scan is completely finished, but image output cannot be started.

Therefore, when originals are placed on the platen glass for copying (more correctly, when the originals are placed on the platen glass one sheet at a time for copying while color/monochrome distinction is automatically being performed), the copying result can be obtained faster by adopting the prescan mode.

In the present embodiment, it has been arranged such that the optimum mode of operation is automatically selected in such a manner that when originals are placed on the platen glass for copying, the prescan mode is automatically selected and when the automatic document feeder is used, the prescanless mode is automatically selected.

4. Fourth Embodiment 4.1. Structure of the Embodiment

Figure 7:
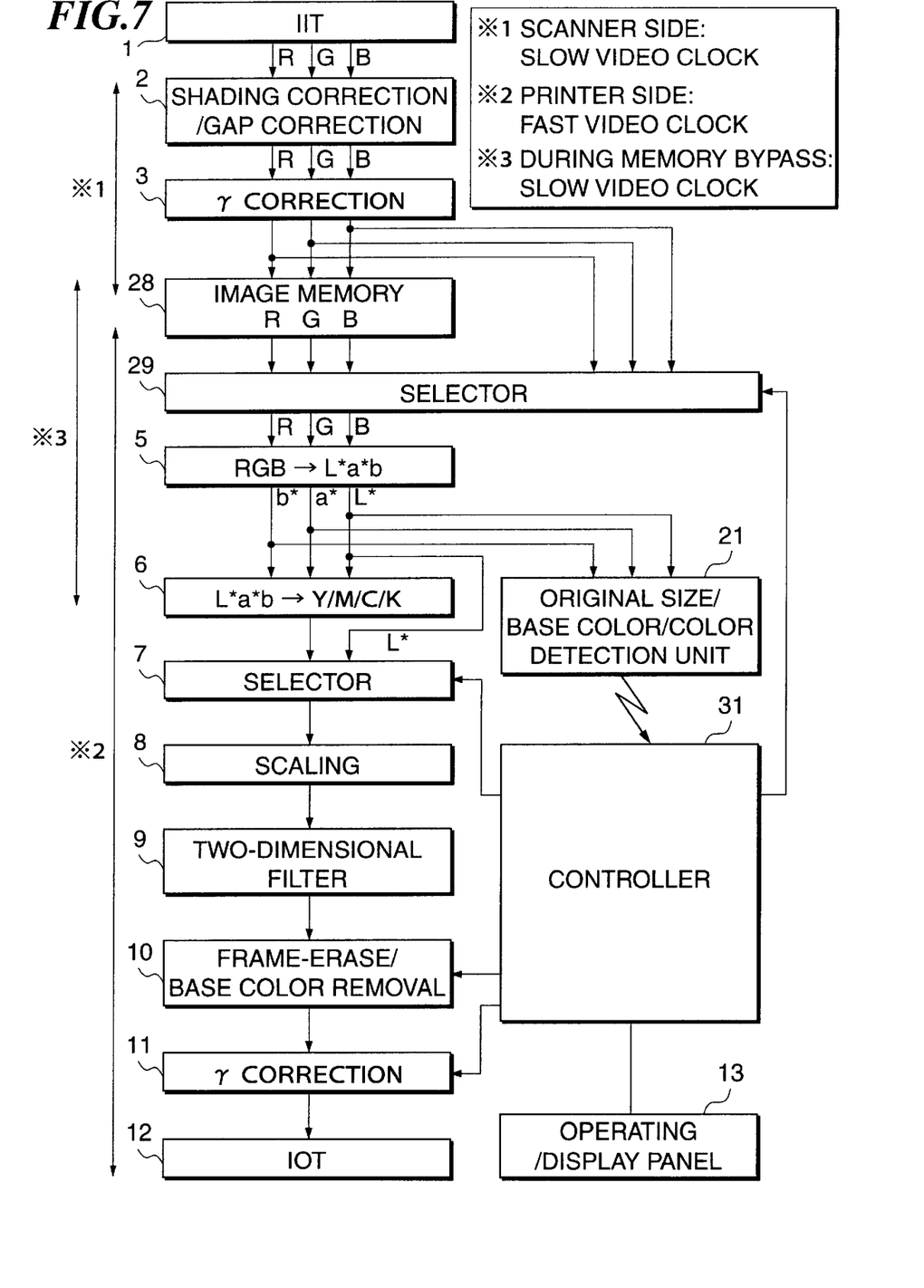
FIG. 7 is a block diagram showing the structure of a fourth embodiment according to the present invention.

FIG. 7 shows the structure of a fourth embodiment according to the present invention. In this respect, in FIG. 7, components equivalent to those in FIGS. 1, 3 and 5 are represented by the same reference numerals. In the present embodiment, an image memory 28 is the same as that in the third embodiment, and is constructed such that image data in the same memory banks can be read and written at the same time.

In FIG. 7, the reference numeral 29 designates a selector, which selects either of input image data to be outputted from the input γ correction unit 3 or the image memory 28 to output to the first color space conversion unit 5. In other words, if the input γ correction unit 3 is selected, the image memory 28 is to be bypassed. The reference numeral 31 designates a controller, which controls each component described above.

4.2. Operation of the Embodiment 4.2.1. Operation in the Prescanless Mode

In the present embodiment, as in the case of the third embodiment, it is possible to select the prescan mode and the prescanless mode as the mode of operation. Since the selecting conditions for the mode of operation are the same as in the third embodiment, the detail of each mode will be described.

First, the description will be made of the operation in the prescanless mode. When the user sets an original onto the automatic document feeder to depress the start-button provided on the operating/display panel 13, the contents of this original are read in the image input unit 1 as in the case of the first to third embodiments. The contents thus read are sequentially stored in the image memory 28 through the shading/gap correction unit 2 and the input γ correction unit 3 sequentially as input image data of RGB format.

At this time, the input γ correction unit 3 side is selected at the selector 29, the input image data is converted into the L*a*b* format through the selector 29 and the first color space conversion unit 5 sequentially while it is being written in the image memory 28, and thereafter, is supplied to the original size/base color/color detection unit 21. In this respect, since the components between the second color space conversion unit 6 and the image output unit 12 are set to an OFF state at this time, no image output is performed.

Thus, in the original size/base color/color detection unit 21, the original size and the base color level are detected, and color is distinguished from monochrome in the input image data. When all the input image data is stored in the image memory 28, supplying of the input image data to the detection unit 21 is also completed.

Next, in the detection unit 21, the original size and the base color level are detected, and color is distinguished from monochrome in the input image data, and the controller 31 is notified of the results. Next, in the controller 31, the selection state of the selector 7, the conversion characteristic in the second color space conversion unit 6, the base color level in the frame-erase/base color removal unit 10, the characteristic in the output γ correction unit 11 and the like are set on the basis of the detection results.

After the completion of the above-described setting, the image memory 28 side is selected in the selector 29, and the contents of the image memory 28 are read out under the control of the controller 27. This image data of the RGB format is converted into the L*a*b* format through the first color space conversion unit 5, and thereafter, as in the case of the first embodiment, is outputted from the image output unit 12 through the second color space conversion unit 6 to the output γ correction unit 11 sequentially.

Figure 8:
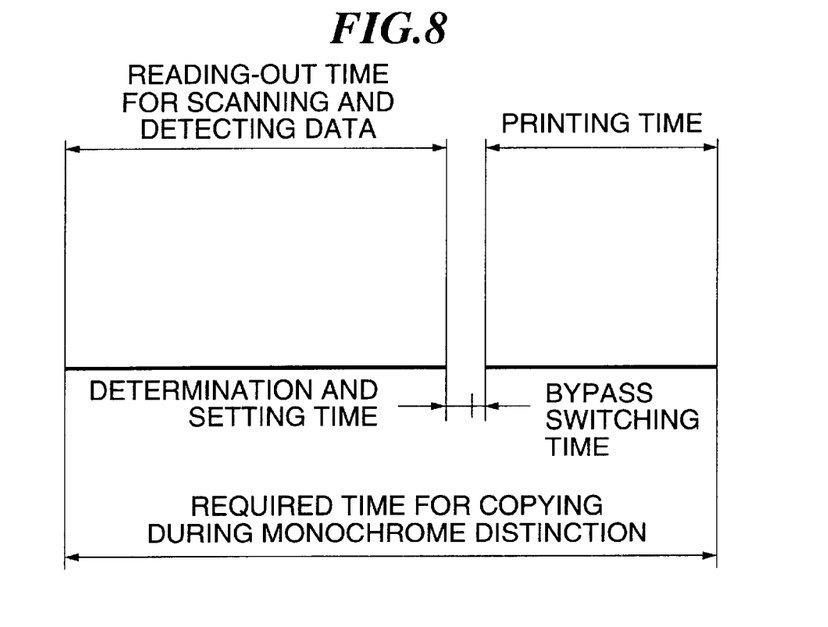
FIG. 8 is a timing chart for the fourth embodiment.

FIG. 8 shows a simple timing chart according to the present embodiment. When the "reading-out time for scanning and detecting data" in FIG. 8 is started in the beginning, the original image is read and the input image data is in parallel supplied to the image memory 28 and the detection unit 21. At the completion of supplying of the input image data, the original size and the base color level are detected, and color is distinguished from monochrome in the detection unit 21.

Thereafter, the image data is outputted onto a sheet or the like in "printing time" after a certain period of setting time and the like. Since the image can be thus outputted immediately after the completion of the "reading-out time for scanning and detecting data" even in the present embodiment, it is possible to output the image at a further higher speed than in the first embodiment.

4.2.2. Operation in Prescan Mode

Next, a description will be made of the operation in the prescan mode. When the user sets an original onto the platen glass to depress the start-button provided on the operating/display panel 13, prescan is performed at a speed several times faster than the image scan. At the time, the image memory 28 is write inhibited and the input γ correction unit 3 side is selected at the selector 29.

Therefore, the input image data thus prescanned is converted into the L*a*b* format through the selector 29 and the first color space conversion unit 5 sequentially, and thereafter, is supplied to the original size/base color/color detection unit 21. Thus, in the original size/base color/color detection unit 21, the original size and the base color level are detected, and color is distinguished from monochrome in the input image data, and the controller 27 is notified of the results.

Next, in the controller 27, the selection state of the selector 7, the conversion characteristic in the second color space conversion unit 6, the base color level in the frame-erase/base color removal unit 10, the characteristic in the output γ correction unit 11 and the like are set on the basis of the detection results. Thereafter, the return of the carriage is completed, and when the effect is detected by the controller 27, the image scan is next executed.

While the image scan is being executed, the input image data is successively stored in the image memory 28. In this case, at a point of time whereat a predetermined amount of input image data has been stored in the image memory 28, reading-out of the image memory 28 is executed in parallel. The image data of the RGB format thus read out is converted into the L*a*b* format through the first color space conversion unit 5, and thereafter, as in the case of the prescanless mode, is outputted from the image output unit 12 through the second color space conversion unit 6 to the output γ correction unit 11 sequentially.

As described above, in the present embodiment, copying can be performed at the same timing as in the third embodiment, and an appropriate mode of operation can be selected in accordance with whether the original has been set on an automatic document feeder or a platen glass.

5. Variations

The present invention is not limited to the above-described embodiments, but various variations can be performed, for example, as below.

(1) For the above-described image memory 4 or 28, the ping-pong buffer structure has been adopted, and the structure, in which image data already stored can be read out while the input image data is being stored, is not limited to the ping-pong buffer structure. Thus, there is shown, in FIG. 12, an example of an image memory of the FIFO structure capable of being used in place of the image memory 4 or 28.

Figure 12:
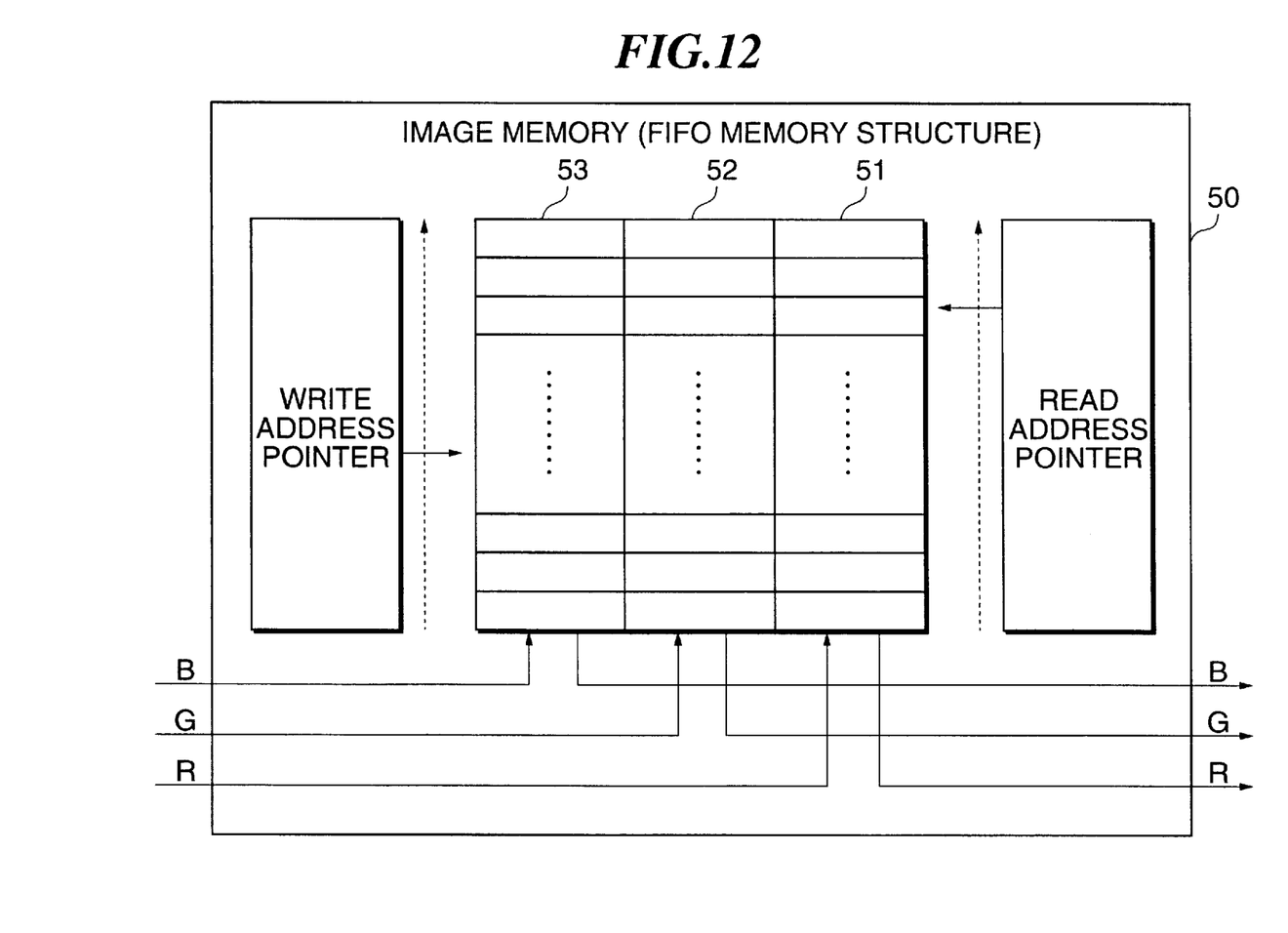
FIG. 12 is a block diagram showing a modification of an image memory 4, 28.

In FIG. 12, the reference numerals 51, 52 and 53 designate R, G and B planes respectively, each of which has a memory capacity somewhat larger than one page of the original image. The controllers 22, 25, 27 and 31 according to the first to third embodiments generate a read address pointer and a write address pointer which are incremented in a circulative manner within the range of each plane, on the basis of which the input image data is read out and written.

(2) Selective Reference in the Mode of Operation

In FIG. 11, an image output period (time T4) when the prescanless mode has been selected is shorter than an image output period (time T2) when the prescan mode has been selected, and this shows an example when a number of copies is "one sheet". When the number of copies exceeds a predetermined number (about two to three), time required for image output becomes longer than time required for image input, and therefore, the image output period becomes the same even if either mode is adopted.

If the image output periods are the same, the prescan mode, in which time (time T1 and time T3 in FIG. 11) before first image output is started is shorter, is more advantageous. Therefore, in each of the embodiments described above, it may be determined by the controller 22, 25, 27 or 31 "whether or not an original is set on the automatic document feeder and a number of copies is a predetermined number or less" in such a manner that the prescanless mode is selected only when the determination result is negative, and that the prescan mode is selected in the other case.

(3) Selective Reference in the Mode of Operation in Response to Magnification Ratio In each embodiment and the variation described above, in a case where it is determined that "the prescanless mode is selected", it may be finally determined whether or not the prescanless mode is selected in accordance with a magnification ratio further set on the operating/display panel 13. More specifically, in such a case, when the magnification ratio is 100% or its integral multiple, the prescanless mode may be selected, and when any magnification ratio other than it is set, the prescan mode may be selected.

The reason will be described. Timing for each color of the input image data is delayed in accordance with physical intervals of the 3-line CCD in the shading/gap correction unit 2 as described above, and if the delay time is not an integral multiple of an 1-line reading period in the sub-scanning direction, the upper and lower lines in the input image data will be subjected to an interpolation process.

When the interpolation process is performed, the edge portion becomes blurred as compared with the first original image. Moreover, since each line of the 3-line CCD is different in physical position, this way of becoming blurred differs for each color of RGB. Therefore, even when a monochrome original has been read in the image input unit 1, a contour of chromatic color appears at the monochromic boundary portion of an output signal from the shading/gap correction unit 2.

When this contour of chromatic color is detected by the original size/base color/color detection unit 21, it is to be determined to be a color original although the original is monochromatic. Thus, if prescan is certainly performed with the exception of a case where the magnification ratio is 100% or its integral multiple, such a defect can be eliminated.

According to the present invention as described above, input image data is stored in the image accumulation unit and the conversion characteristic is set, and thereafter, the input image data is converted into output image data to be expressed in the second color space while the input image data is being read out from the image accumulation unit. Therefore, it becomes possible to output the image without performing the prescan, and to obtain the image output at high speed.

What is claimed is:

1. An image reader, comprising:
   an image reading unit that reads an image of an original as image data;
   an image accumulation unit that accumulates the image data read by the image reading unit;
   an attribute distinction unit that distinguishes an attribute of the image data read by the image reading unit in parallel with accumulation of the input image data in the image accumulation unit;
   an operating unit that sets a magnification ratio for reproducing the original; and
   an image input unit that performs an image scan without performing a prescan if the magnification ratio of 100% or its integral multiple has been set in the operating unit, and that performs the image scan after the attribute of the image data of the original is distinguished using the prescan if the magnification ratio other than 100% or its integral multiple has been set.

2. The image reader according to claim 1, wherein the attribute of the input image data contains at least one of a size of the original of the input image data, a base color level of the input image data, and whether the input image data is monochromatic or colored, and the image reader further comprising a path bypassing the image accumulation unit to supply the input image data to the attribute distinction unit.

3. The image reader according to claim 1, wherein the image reading unit sequentially reads images of a plurality of originals to output them as the input image data, and the image accumulation unit comprises a plurality of memory banks, each having a capacity for storing input image data of one original, and writes new input image data in one of the memory banks and at the same time, outputs input image data already written from another memory bank.

4. The image reader according to claim 1, wherein the image reading unit sequentially reads contents of a plurality of originals to output them as the input image data, and the image accumulation unit writes new input image data and at the same time, outputs the input image data already written.

5. The image reader according to claim 1 wherein the original is set on an automatic document feeder or a platen glass, and further comprising:
   a determination unit that determines whether the original has been set on the document feeder or the platen glass; and
   an image input unit that performs, if the determination unit determines that the original has been set on the platen glass, an image scan after the attribute of the image data of the original is distinguished using a prescan, and that performs, if the determination unit determines that the original has been set on the automatic document feeder, the image scan without performing the prescan.

6. The image reader according to claim 1 wherein the original is set on an automatic document feeder or a platen glass, and further comprising:
   a determination unit that determines whether the original has been set on the automatic document feeder, and whether a number of copies is not more than a predetermined number; and
   an image input unit that performs an image scan after the attribute of the image data of the original is distinguished using a prescan if a result of the determination by the determination unit is affirmative, and performs the image scan without performing the prescan if the result of the determination is negative.

7. An image reader, comprising:
   an image reading unit that reads an image of an original as image data;
   an image accumulation unit that accumulates the image data read by the image reading unit; and
   an attribute distinction unit that distinguishes an attribute of the image data read by the image reading unit in parallel with accumulation of the input image data in the image accumulation unit,
   wherein the original is set on an automatic document feeder or a platen glass, and further comprising:
      a determination unit that determines whether the original has been set on the document feeder or the platen glass; and
      an image input unit that performs, if the determination unit determines that the original has been set on the platen glass, an image scan after the attribute of the image data of the original is distinguished using a prescan, and that performs, if the determination unit determines that the original has been set on the automatic document feeder, the image scan without performing the prescan.

8. The image reader according to claim 7, further comprising:
   an operating unit that sets a magnification ratio for reproducing the original; and
   an image input unit that performs an image scan without performing a prescan if the magnification ratio of 100% or its integral multiple has been set in the operating unit, and that performs the image scan after the attribute of the image data of the original is distinguished using the prescan if the magnification ratio other than 100% or its integral multiple has been set.

9. The image reader according to claim 7, wherein the image reading unit sequentially reads images of a plurality of originals to output them as the input image data, and the image accumulation unit comprises a plurality of memory banks, each having a capacity for storing input image data of one original, and writes new input image data in one of the memory banks and at the same time, outputs input image data already written from another memory bank.

10. The image reader according to claim 7, wherein the image reading unit sequentially reads contents of a plurality of originals to output them as the input image data, and the image accumulation unit writes new input image data and at the same time, outputs the input image data already written.

11. An image reader, comprising:
   an image reading unit that reads an image of an original as image data;
   an image accumulation unit that accumulates the image data read by the image reading unit; and
   an attribute distinction unit that distinguishes an attribute of the image data read by the image reading unit in parallel with accumulation of the input image data in the image accumulation unit,
   wherein the original is set on an automatic document feeder or a platen glass, and further comprising:
      a determination unit that determines whether the original has been set on the automatic document feeder, and whether a number of copies is not more than a predetermined number; and
      an image input unit that performs an image scan after the attribute of the image data of the original is distinguished using a prescan if a result of the determination by the determination unit is affirmative, and performs the image scan without performing the prescan if the result of the determination is negative.

12. The image reader according to claim 11, further comprising:
   an operating unit that sets a magnification ratio for reproducing the original; and
   an image input unit that performs an image scan without performing a prescan if the magnification ratio of 100% or its integral multiple has been set in the operating unit, and that performs the image scan after the attribute of the image data of the original is distinguished using the prescan if the magnification ratio other than 100% or its integral multiple has been set.

13. The image reader according to claim 11, wherein the image reading unit sequentially reads images of a plurality of originals to output them as the input image data, and the image accumulation unit comprises a plurality of memory banks, each having a capacity for storing input image data of one original, and writes new input image data in one of the memory banks and at the same time, outputs input image data already written from another memory bank.

14. The image reader according to claim 11, wherein the image reading unit sequentially reads contents of a plurality of originals to output them as the input image data, and the image accumulation unit writes new input image data and at the same time, outputs the input image data already written.

* * * * *